United States Patent
Luo (10) Patent No.: US 9,529,677 B2
(45) Date of Patent: Dec. 27, 2016

(54) METHOD AND SYSTEM FOR REMOVING FAULT APPLIED FOR MACHINE TO MACHINE GATEWAY

(71) Applicant: ZTE Corporation, Shenzhen (CN)

(72) Inventor: Qianpeng Luo, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 38 days.

(21) Appl. No.: 14/436,297

(22) PCT Filed: Sep. 16, 2013

(86) PCT No.: PCT/CN2013/083580
§ 371 (c)(1),
(2) Date: Apr. 16, 2015

(87) PCT Pub. No.: WO2014/059843
PCT Pub. Date: Apr. 24, 2014

(65) Prior Publication Data
US 2015/0261612 A1  Sep. 17, 2015

(30) Foreign Application Priority Data
Oct. 17, 2012 (CN) .......................... 2012 1 0395212

(51) Int. Cl.
*G06F 11/00* (2006.01)
*G06F 11/14* (2006.01)
(Continued)

(52) U.S. Cl.
CPC ............ *G06F 11/142* (2013.01); *H04L 12/24* (2013.01); *H04L 41/0654* (2013.01); *H04W 4/005* (2013.01); *G06F 2201/85* (2013.01)

(58) Field of Classification Search
USPC ....................................................... 714/4.2
See application file for complete search history.

(56) References Cited

U.S. PATENT DOCUMENTS

| 2011/0213871 A1 | 9/2011 | DiGirolamo |
| 2013/0041997 A1* | 2/2013 | Li .......................... H04L 67/12 709/223 |

(Continued)

FOREIGN PATENT DOCUMENTS

| CN | 102231739 A | 11/2011 |
| CN | 102638824 A | 8/2012 |

(Continued)

OTHER PUBLICATIONS

International Search Report for corresponding application PCT/CN2013/083580 filed Sep. 16, 2013; Mail date Jan. 16, 2014.

(Continued)

*Primary Examiner* — Sarai Butler
(74) *Attorney, Agent, or Firm* — Cantor Colburn LLP (57) ABSTRACT

Provided are a method and a system for removing a fault applied for an M2M gateway. The method includes: receiving, by an M2M gateway, an automatic code matching command, wherein the automatic code matching command is sent when a communication fault is detected by a sensor; and performing, by the M2M gateway, code matching identification according to the received automatic code matching command, and adding the sensor in a sensor management component of the M2M gateway if code matching is performed successfully. According to the method and the system for removing a fault applied for an M2M gateway according to the disclosure, automatic fault removing between an M2M gateway and a sensor can be realized, and using of the M2M gateway can be recovered. The method for automatically removing a fault applied for an M2M gateway provides three fault removing mechanisms, different functions can be realized on different network elements, an M2M gateway and a sensor with an automatic fault removing function are realized, and the using reliability of the M2M gateway is effectively enhanced.

13 Claims, 3 Drawing Sheets

(51) Int. Cl.
*H04L 12/24* (2006.01)
*H04W 4/00* (2009.01)

(56) References Cited

U.S. PATENT DOCUMENTS

2013/0042011 A1  2/2013 Sugizaki
2014/0313908 A1* 10/2014 da Silva ............... H04W 4/005
                                                        370/252

FOREIGN PATENT DOCUMENTS

WO   2011129098 A1   10/2011
WO   2012177038 A2   12/2012

OTHER PUBLICATIONS

European Search Report for corresponding application EP 13 84 7374; Report Issued Oct. 22, 2015.

* cited by examiner

METHOD AND SYSTEM FOR REMOVING FAULT APPLIED FOR MACHINE TO MACHINE GATEWAY

TECHNICAL FIELD

The disclosure relates to the technical field of the Machine to Machine (M2M), and in particular to a method and system for removing a fault applied for an M2M gateway.

BACKGROUND

Machine to Machine (M2M), which is a networked application and service with intelligent interaction among machine terminals as the core, collects data via various M2M terminals (e.g. various sensors), and centralizes the data to an M2M platform via an M2M gateway in a unified manner so as to provide corresponding monitoring data from M2M terminals for a user.

Generally, an important function of the M2M is to complete a specific management function by using monitoring data reported by an M2M terminal so as to generate a certain kind of information or ability that is valuable in people's daily life or work.

At present, an M2M gateway can report information to an M2M platform, and is able to gather information and route a message for a sensor. Therefore, an M2M gateway is of great importance in an M2M network and the stability and reliability of the M2M gateway is of great significance for the M2M. However, in an actual M2M gateway deployment environment, different degrees of faults may often occur to a wireless connection between an M2M gateway and a sensor. Thus, when communication faults occur between the M2M gateway and the sensor, it is a problem to be solved to automatically remove these faults.

SUMMARY

To solve the problem of automatically removing faults when these communication faults occur between an M2M gateway and a sensor, the embodiments of the disclosure provide a method and system for removing a fault applied for an M2M gateway.

According to an aspect of the embodiments of the disclosure, a method for removing a fault applied for an M2M gateway is provided, including: receiving, by an M2M gateway, an automatic code matching command, wherein the automatic code matching command is sent when a communication fault is detected by a sensor; performing, by the M2M gateway, code matching identification according to the received automatic code matching command, and adding the sensor in a sensor management component of the M2M gateway if code matching is performed successfully.

In an example embodiment, in a case the M2M gateway fails to identify the code matching of the sensor, the M2M gateway downloads a sensor code matching repository from an M2M sensor management component and performs code matching again, wherein the M2M sensor management component includes all basic information about sensors in an M2M.

In an example embodiment, in a case that the sensor fails to perform the code matching with the M2M gateway successfully, the sensor is a faulty sensor; the faulty sensor sends to an adjacent sensor of the faulty sensor a code matching command; the adjacent sensor performs code matching identification according to the code matching command, and if the adjacent sensor is able to identify the code matching of the faulty sensor, the adjacent sensor sends to a routing component a communication route establishment message; the routing component adds the faulty sensor in a routing table of the routing component itself and sends to the faulty sensor a code matching success feedback message.

In an example embodiment, after the faulty sensor performs code matching with the adjacent sensor successfully, the faulty sensor sends to the adjacent sensor an uplink message when communication with the M2M gateway is necessary, and after encapsulating the uplink message, the adjacent sensor sends the uplink message to the M2M gateway; and for a downlink message not intended for the adjacent sensor itself from the M2M gateway, the adjacent sensor inquires the routing table to obtain a matched faulty sensor, and forwards the downlink message to the obtained faulty sensor.

According to another aspect of the embodiments of the disclosure, an M2M system is further provided, including: a faulty sensor configured to, when a communication fault is detected, send to an adjacent sensor of the faulty sensor a code matching command; an M2M gateway, configured to receive an automatic code matching command, wherein the automatic code matching command is sent when a communication fault is detected by a sensor; and configured to perform code matching identification according to the received automatic code matching command, and add the sensor in a sensor management component of the M2M gateway if code matching is performed successfully.

In an example embodiment, the M2M system further includes: an M2M sensor management component, configured to store a sensor code matching repository and comprising all basic information about sensors in an M2M, so that in a case that the M2M gateway fails to identify code matching of the faulty sensor, the M2M gateway downloads the sensor code matching repository from the M2M sensor management component and performs code matching again.

In an example embodiment, the M2M system further includes: an adjacent sensor configured to, in a case that the M2M gateway fails to identify code matching of the faulty sensor and the faulty sensor sends to the adjacent sensor of the faulty sensor a code matching command, perform code matching identification according to the code matching command, and if the adjacent sensor is able to identify the code matching of the faulty sensor, send to a routing component a communication route establishment message, wherein the routing component adds the faulty sensor in a routing table of the routing component itself and sends to the faulty sensor a code matching success feedback message.

In an example embodiment, after the faulty sensor performs code matching with the adjacent sensor successfully, the faulty sensor sends to the adjacent sensor an uplink message when communication with the M2M gateway is necessary, and after encapsulating the uplink message, the adjacent sensor sends the uplink message to the M2M gateway; and for a downlink message not intended for the adjacent sensor itself from the M2M gateway, the adjacent sensor inquires the routing table to obtain a matched faulty sensor, and forwards the downlink message to the obtained faulty sensor.

According to still another aspect of the embodiments of the disclosure, an M2M gateway is further provided, including: an M2M intercommunication component, configured to communicate with an M2M platform via a public communication channel; a local communication component, configured to communicate with a sensor, and in a case that a fault is detected by a faulty sensor, obtain an automatic code matching command sent by the faulty sensor, and perform code matching identification according to the received automatic code matching command; a protocol processing component, configured to take charge of a processing of an M2M application protocol, and convert a message to be of a protocol capable of being identified by the M2M platform; a sensor management component, configured to take charge of sensor management, communication channel allocation management and identification code allocation management in a range of the M2M gateway; a first automatic fault removing component configured to, in a case that the local communication component performs code matching successfully, adds the faulty sensor in the sensor management component.

In an example embodiment, the faulty sensor includes: a communication component, configured to communicate with the M2M gateway and an adjacent sensor; a code matching component, configured to perform mutual code matching with the M2M gateway or the adjacent sensor, and configured to generate an automatic code matching command according to an obtained code matching command, and send the automatic code matching command to the M2M gateway; a second automatic fault removing component configured to, in a case that a communication fault is detected, send a code matching command to the code matching component; a routing component, configured to perform routing transmission of a sensor message during intercommunication between sensors.

In an example embodiment, when the local communication component fails to identify the code matching of the faulty sensor, the first automatic fault removing component downloads a sensor code matching repository from an M2M sensor management component, wherein the M2M sensor management component comprises all basic information about sensors in an M2M.

In an example embodiment, when the local communication component fails to identify the code matching of the faulty sensor, the code matching component of the faulty sensor sends to an adjacent sensor of the faulty sensor a code matching command; a code matching component of the adjacent sensor performs code matching identification according to the code matching command, and if the code matching component of the adjacent sensor is able to identify the code matching of the faulty sensor, the adjacent sensor sends to a routing component a communication route establishment message; the routing component adds the faulty sensor in a routing table of the routing component itself, and sends to the faulty sensor a code matching success feedback message.

In an example embodiment, after the faulty sensor performs code matching with the adjacent sensor successfully, the faulty sensor sends to the adjacent sensor an uplink message when communication with the M2M gateway is necessary, and after encapsulating the uplink message, the adjacent sensor sends the uplink message to the M2M gateway; and for a downlink message not intended for the adjacent sensor itself from the M2M gateway, the adjacent sensor inquires the routing table to obtain a matched faulty sensor, and forwards the downlink message to the obtained faulty sensor.

It can be seen from the technical solution of the embodiments of the disclosure that the method and system for removing a fault applied for an M2M gateway according to the embodiments of the disclosure can realize automatic fault removing between an M2M gateway and a sensor and recover communication between the M2M gateway and the sensor. The method for automatically removing a fault applied for an M2M gateway provides three fault removing mechanisms, different functions can be realized on different network elements, an M2M gateway and a sensor with an automatic fault removing function are realized, thereby effectively enhancing the using reliability of the M2M gateway.

Implementation of the purpose of the disclosure, functional features and excellent effects will be further described below in conjunction with specific embodiments and the accompanying drawings.

DETAILED DESCRIPTION OF THE INVENTION

The technical solution of the disclosure will be further described in details below in conjunction with the accompanying drawings and specific embodiments so that those skilled in the art can better understand and implement the disclosure. However, the embodiments as illustrated cannot be taken as limitation to the disclosure.

A method for removing a fault applied for an M2M gateway according to an embodiment of the disclosure includes the following S10 to S20.

S10: when detecting a communication fault, a sensor sends to an M2M gateway an automatic code matching command;

S20: the M2M gateway performs code matching identification according to the received automatic code matching command, and adds the sensor in a sensor management component of the M2M gateway if code matching is performed successfully.

In an example embodiment, in S20, when the sensor fails to perform the code matching with the M2M gateway successfully, the M2M gateway downloads a sensor code matching repository from an M2M sensor management component and performs code matching again, wherein the M2M sensor management component includes all basic information about sensors in an M2M.

In another example embodiment, when the sensor fails to perform the code matching with the M2M gateway successfully, the faulty sensor may send to an adjacent sensor in the periphery a code matching command; the adjacent sensor performs code matching identification according to the code matching command, and if the adjacent sensor is able to identify the code matching of the faulty sensor, the adjacent sensor sends to a routing component a communication route establishment message; the routing component adds the faulty sensor in a routing table of the routing component itself and sends to the faulty sensor a code matching success feedback message.

In an example embodiment, after the faulty sensor performs code matching with the adjacent sensor successfully, the faulty sensor sends to the adjacent sensor an uplink message when communication with the M2M gateway is necessary, and after encapsulating the uplink message, the adjacent sensor sends the uplink message to the M2M gateway; and for a downlink message not intended for the adjacent sensor itself from the M2M gateway, the adjacent sensor inquires the routing table to obtain a matched faulty sensor, and forwards the downlink message to the obtained faulty sensor.

The embodiments of the disclosure provide a method for automatically removing a fault applied for an M2M gateway. When a communication fault occurs between an M2M gateway and a sensor, the method can identify the fault automatically, perform code matching automatically, perform mutual link establishment and route messages etc., thus realizing a function of automatically removing the fault between the M2M gateway and the sensor. A system for realizing the method can realize an ability of automatically removing a fault between an M2M gateway and a sensor, thereby extending application of the M2M gateway and the sensor.

Figure 1:
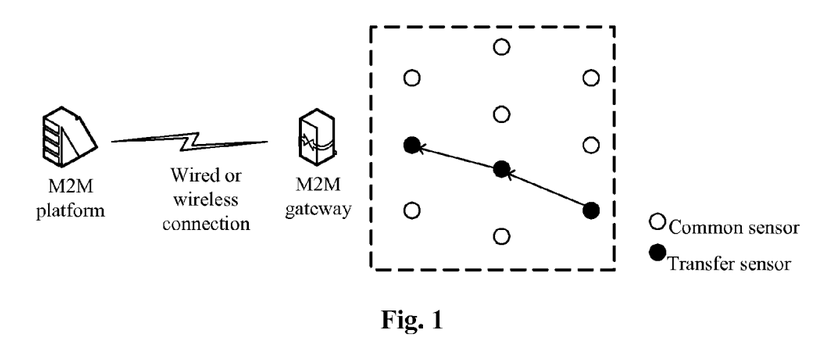
FIG. 1 is a schematic diagram showing the connection structure among an M2M gateway and sensors in an embodiment of the disclosure.

An embodiment of the disclosure further provides an M2M system. Referring to FIG. 1, the M2M system includes:

a faulty sensor configured to, when a communication fault is detected, send to an M2M gateway an automatic code matching command;

an M2M gateway configured to perform code matching identification according to the received automatic code matching command, and adds the faulty sensor in a sensor management component of the M2M gateway if code matching is performed successfully.

In this system, one M2M gateway may be coupled with a plurality of sensors and the sensors may communicate with each other.

In an example embodiment, the M2M system further includes:

an M2M sensor management component, configured to store a sensor code matching repository and including all basic information about sensors in an M2M, so that in the case that the M2M gateway fails to identify the code matching of the faulty sensor, the M2M gateway downloads the sensor code matching repository from the M2M sensor management component and performs code matching again.

In an example embodiment, the M2M system further includes:

an adjacent sensor configured to: in the case that the M2M gateway fails to identify the code matching of the faulty sensor and the faulty sensor sends to the adjacent sensor in the periphery a code matching command, perform code matching identification according to the code matching command, and if the adjacent sensor is able to identify the code matching of the faulty sensor, send to a routing component a communication route establishment message, wherein the routing component adds the faulty sensor in a routing table of the routing component itself and sends to the faulty sensor a code matching success feedback message.

In an example embodiment, after the faulty sensor performs code matching with the adjacent sensor successfully, the faulty sensor sends to the adjacent sensor an uplink message when communication with the M2M gateway is necessary, and after encapsulating the uplink message, the adjacent sensor sends the uplink message to the M2M gateway; and for a downlink message not intended for the adjacent sensor itself from the M2M gateway, the adjacent sensor inquires the routing table to obtain a matched faulty sensor, and forwards the downlink message to the obtained faulty sensor.

The M2M system for automatically removing a fault according to the embodiments of the disclosure mainly includes two major parts: the M2M gateway and the sensor(s). One M2M gateway may be coupled with a plurality of sensors and the sensors may communicate with each other, wherein connection among the M2M gateway and the sensors is as shown in FIG. 1.

Figure 2:
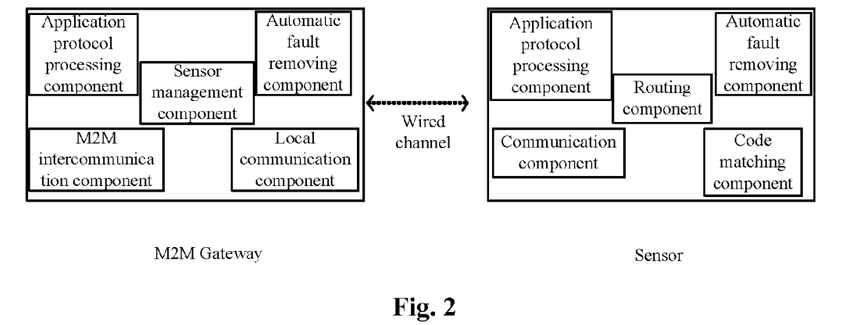
FIG. 2 is a schematic diagram showing the functional structure of an M2M gateway and a sensor in an embodiment of the disclosure.

As shown in FIG. 2, the M2M gateway of the M2M system mainly includes components such as an M2M intercommunication component, a local communication component, a protocol processing component, a sensor management component, and a first automatic fault removing component.

The M2M intercommunication component is in charge of communication between the M2M gateway and an M2M platform via a public communication channel.

The local communication component is in charge of communication between the M2M gateway and a sensor.

The protocol processing component is in charge of processing of an M2M application protocol to convert a message to be of a protocol capable of being identified by the M2M platform.

The sensor management component is in charge of sensor management, and allocation of communication channels and identification codes etc. in a range of the M2M gateway.

The first automatic fault removing component is a component for processing a fault when a sensor cannot be connected.

As shown in FIG. 2, the sensor in the M2M system mainly includes components such as a communication component, a code matching component, a second automatic fault removing component, and a routing component.

The communication component is in charge of communication with the M2M gateway and the sensor.

The code matching component is in charge of mutual code matching between the sensor and the M2M gateway or between the sensor and another sensor to realize intercommunication.

The second automatic fault removing component is in charge of processing a sensor fault.

The routing component is in charge of transmitting a sensor message when sensors are intercommunicating.

The first automatic fault removing component of the M2M gateway of the M2M system is the core of the fault removing function of the M2M gateway.

When a communication fault of the sensor occurs, the second automatic fault removing component of the sensor sends to the code matching component of the sensor a code matching command and the code matching component sends to the M2M gateway an automatic code matching command.

Figure 3:
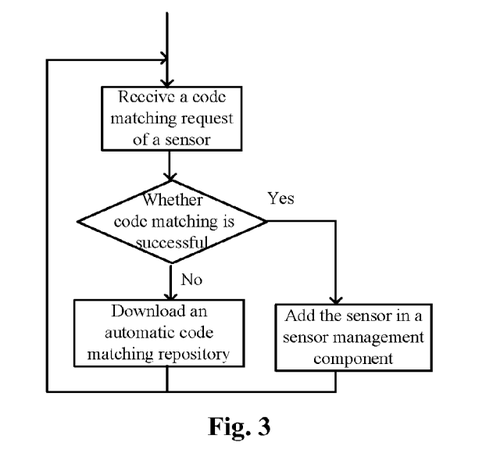
FIG. 3 is a schematic diagram showing a processing flow of an automatic fault removing component of an M2M gateway in an embodiment of the disclosure.

As shown in FIG. 3, the M2M gateway receives the automatic code matching command sent by the sensor; the local communication component performs code matching identification, and when code matching of the sensor cannot be identified, responds with a code matching failure command to the sensor, and sends to the first automatic fault removing component a code matching failure message; the first automatic fault removing component of the M2M gateway initiatively connects to the sensor code matching repository provided by the M2M system to download the sensor code matching repository or corresponding sensor code matching information to complete a sensor code matching self-learning process. When the sensor performs code matching again, code change and connection of the faulty sensor are completed to remove the fault.

The second automatic fault removing component of the sensor of the M2M system implements two functions which are fault removing function application on one hand, and fault removing function processing on the other hand.

For the sensor in which a fault occurs, the sensor enters a fault removing phase, and the second automatic fault removing component of the sensor sends an automatic fault removing command. In order to distinguish code matching of the M2M gateway from that of the sensor, the sensor sends out two kinds of code matching commands, one of which are code matching commands to the M2M gateway and the other kind are code matching commands among sensors.

Figure 4:
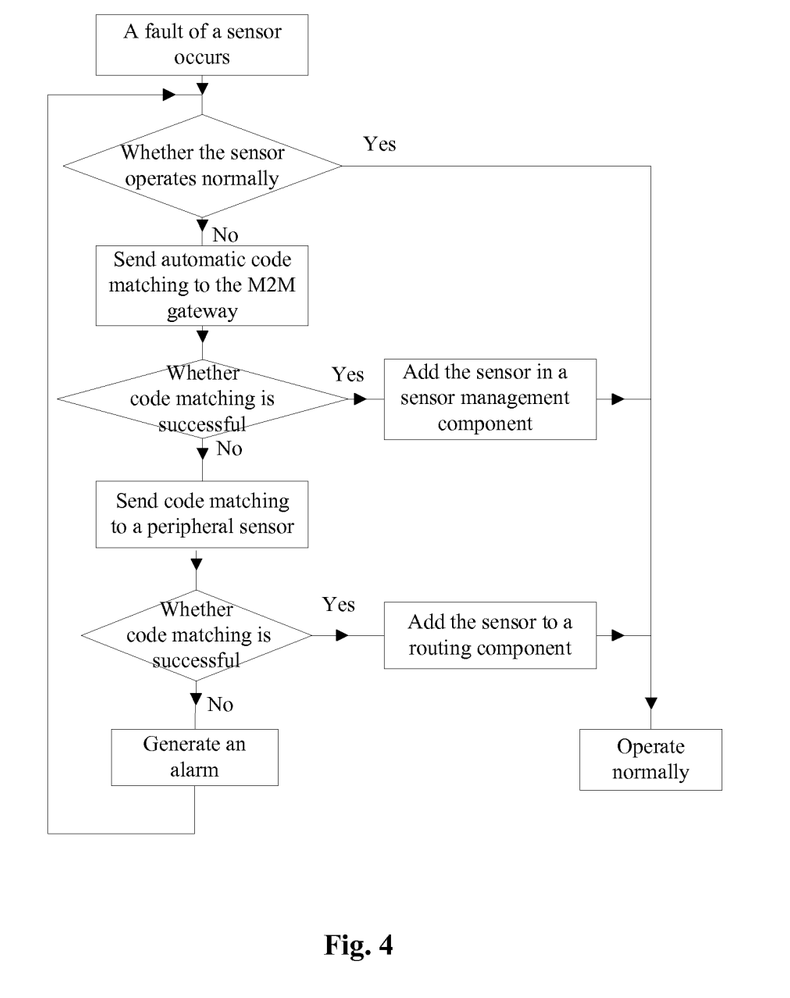
FIG. 4 is a schematic diagram showing an automatic fault removing flow of an M2M sensor in an embodiment of the disclosure.

Referring to FIG. 4, the faulty sensor first sends a code matching command to the M2M gateway, if code matching with the M2M gateway succeeds, re-establishes a connection with the M2M gateway to remove the fault; and if code matching with the M2M gateway fails, sends a code matching command to a sensor within a communication range. The sensor receiving the code matching command sends to the faulty sensor a response message. If code matching is performed successfully, the second automatic fault removing component of the sensor sends to the routing component a communication route establishment message. The routing component adds the faulty sensor in the routing table of the routing component itself. When a message which needs to be forwarded to the faulty sensor is received, the message is transmitted according to the routing table.

The M2M system for automatically removing a fault applied for an M2M gateway according to the embodiments of the disclosure can automatically remove a fault when the communication fault occurs between an M2M gateway and a sensor, thus enhancing the ability of processing a fault by the M2M gateway and providing an effective using environment for an application. The M2M system, referring to FIG. 5, removes a fault automatically mainly through several steps as follows after the fault occurs between the M2M gateway and the sensor.

Figure 5:
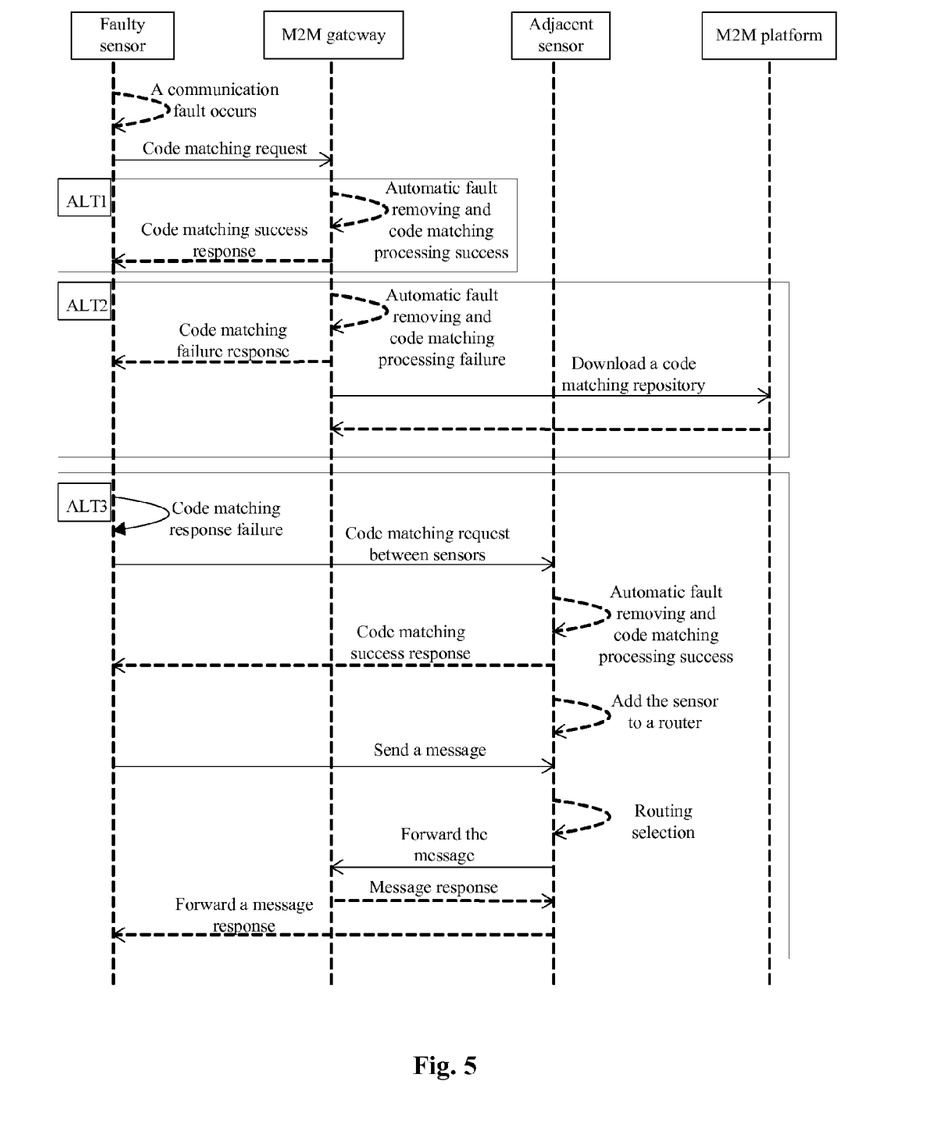
FIG. 5 is a schematic diagram showing cooperation of components during an automatic fault removing operation performed by an M2M system in an embodiment of the disclosure.

Step 1: a communication fault occurs between the sensor and the M2M gateway.

When the communication fault occurs between the sensor and the M2M gateway, the sensor enters an automatic code matching flow for removing the fault.

When a fault occurs to the sensor of the M2M gateway, the M2M gateway enters a code matching and fault removing mode. The M2M gateway receives a code matching request sent by the sensor; the command enters the first automatic fault removing component; the component performs code matching analysis, and responds a success indication if the code matching can be identified and code matching is successful; the sensor is added in a sensor management component of the M2M gateway to set related information for subsequent communication. If the code matching cannot be identified, the M2M gateway responds with an identification failure.

Step 2: the sensor enters intercommunication and code matching among sensors.

When receiving an error indicating a code matching identification failure from the M2M gateway, the faulty sensor enters a code matching mode among sensors. The sensor in which the fault occurs sends to an adjacent sensor in the periphery a code matching command. The adjacent sensor in the periphery receives the code matching command, and a corresponding second automatic fault removing component performs code matching identification. If the second automatic fault removing component can identify code matching of the sensor, the sensor receiving the command adds to a routing component related information of the faulty sensor and sends to the faulty sensor a code matching success feedback message. After code matching between the sensors succeeds, the faulty sensor will send the message to a lower level adjacent sensor during communication, and the lower level adjacent sensor sends the message to the M2M gateway after performing encapsulation. For a message not intended for the adjacent sensor itself from the M2M gateway, the adjacent sensor will inquire a routing table to find a matched faulty sensor, and forwards the downlink message to the found faulty sensor, thereby completing recovery of the communication fault.

In the case that code matching between the sensors fails, the faulty sensor will perform the above two modes cyclically.

Step 3: the M2M gateway downloads a code matching repository.

When the first automatic fault removing component of the M2M gateway determines that the code matching of the sensor cannot be identified by the M2M gateway, the first automatic fault removing component of the M2M gateway will send a sensor code matching repository downloading request to a preset M2M sensor management component, wherein the sensor code matching repository includes all basic information of sensors in the M2M. After the M2M gateway downloads the sensor code matching repository successfully, the first automatic fault removing component will be able to respond when the sensor initiates a code matching request next time and will be able to identify correct code matching information.

An embodiment of the disclosure further provides an M2M gateway, including:

an M2M intercommunication component, configured to communicate with an M2M platform via a public communication channel;

a local communication component, configured to communicate with a sensor, and in the case that a fault is detected by a faulty sensor, obtain an automatic code matching command sent by the faulty sensor, and perform code matching identification according to the received automatic code matching command;

a protocol processing component, configured to take charge of a processing of an M2M application protocol, and convert a message to be of a protocol capable of being identified by the M2M platform;

a sensor management component, configured to take charge of sensor management, communication channel allocation management and identification code allocation management in a range of the M2M gateway;

a first automatic fault removing component configured to, in the case that the local communication component performs code matching successfully, adds the faulty sensor in the sensor management component.

In a specific embodiment, the faulty sensor includes:

a communication component, configured to communicate with the M2M gateway and the adjacent sensor;

a code matching component, configured to perform mutual code matching with the M2M gateway or the adjacent sensor, and further configured to generate an automatic code matching command according to an obtained code matching command, and send the automatic code matching command to the M2M gateway;

a second automatic fault removing component configured to, in the case that a communication fault is detected, send a code matching command to the code matching component;

a routing component, configured to perform routing transmission of a sensor message during intercommunication between sensors.

In an example embodiment, when the local communication component fails to identify the code matching of the faulty sensor, the first automatic fault removing component downloads a sensor code matching repository from an M2M sensor management component, wherein the M2M sensor management component includes all basic information about sensors in an M2M.

In another example embodiment, when the local communication component fails to identify the code matching of the faulty sensor, a code matching component of the faulty sensor sends to an adjacent sensor in the periphery a code matching command; a code matching component of the adjacent sensor performs code matching identification according to the code matching command, and if the code matching component of the adjacent sensor is able to identify the code matching of the faulty sensor, sends to the routing component a communication route establishment message; the routing component adds the faulty sensor in a routing table of the routing component itself, and sends to the faulty sensor a code matching success feedback message.

Specifically, after the faulty sensor performs code matching with the adjacent sensor successfully, the faulty sensor sends to the adjacent sensor an uplink message when communication with the M2M gateway is necessary, and after encapsulating the uplink message, the adjacent sensor sends the uplink message to the M2M gateway; and for a downlink message not intended for the adjacent sensor itself from the M2M gateway, the adjacent sensor inquires the routing table to obtain a matched faulty sensor, and forwards the downlink message to the obtained faulty sensor.

What are described above are only example embodiments of the disclosure and the patent scope of the disclosure is not limited thereto. All equivalent structures or equivalent process changes made by utilizing the specification and the accompanying drawings of the disclosure, or the direct or indirect applications thereof in other relevant technical fields, are within the patent protection scope of the disclosure in the similar way.

INDUSTRIAL APPLICABILITY

The technical solution provided by the embodiments of the disclosure can be applied to the field of M2M gateways, thus solving the problem of automatically removing a fault when the communication fault occurs between an M2M gateway and a sensor.

What is claimed is:

1. A method for removing a fault applied for a Machine to Machine (M2M) gateway, comprising:
    receiving, by an M2M gateway, an automatic code matching command, wherein the automatic code matching command is sent when a communication fault is detected by a sensor;
    performing, by the M2M gateway, code matching identification according to the received automatic code matching command, and adding the sensor in a sensor management component of the M2M gateway if code matching is performed successfully.

2. The method for removing a fault applied for an M2M gateway according to claim 1, further comprising:
    in a case that the sensor fails to perform the code matching with the M2M gateway successfully, the M2M gateway downloading a sensor code matching repository from an M2M sensor management component and performing code matching again, wherein the M2M sensor management component comprises all basic information about sensors in an M2M.

3. The method for removing a fault applied for an M2M gateway according to claim 1, wherein in a case that the sensor fails to perform the code matching with the M2M gateway successfully, the sensor is a faulty sensor; the faulty sensor sends to an adjacent sensor of the faulty sensor a code matching command; the adjacent sensor performs code matching identification according to the code matching command, and if the adjacent sensor is able to identify the code matching of the faulty sensor, the adjacent sensor sends to a routing component a communication route establishment message; the routing component adds the faulty sensor in a routing table of the routing component itself and sends to the faulty sensor a code matching success feedback message.

4. The method for removing a fault applied for an M2M gateway according to claim 3, wherein after the faulty sensor performs code matching with the adjacent sensor successfully, the faulty sensor sends to the adjacent sensor an uplink message when communication with the M2M gateway is necessary, and after encapsulating the uplink message, the adjacent sensor sends the uplink message to the M2M gateway; and for a downlink message not intended for the adjacent sensor itself from the M2M gateway, the adjacent sensor inquires the routing table to obtain a matched faulty sensor, and forwards the downlink message to the obtained faulty sensor.

5. A Machine to Machine (M2M) system, comprising:
    a faulty sensor comprising a first processor coupled with a first memory and configured to execute first program instructions on the first memory, wherein the first program instructions comprise: sending to an adjacent sensor of the faulty sensor a code matching command, when a communication fault is detected;
    an M2M gateway comprising a second processor coupled with a second memory and configured to execute second program instructions on the second memory, wherein the second program instructions comprise: receiving an automatic code matching command, wherein the automatic code matching command is sent when a communication fault is detected by a sensor; and performing code matching identification according to the received automatic code matching command, and add the sensor in a sensor management component of the M2M gateway if code matching is performed successfully.

6. The M2M system according to claim 5, further comprising:
    a third memory comprising an M2M sensor management component, configured to store a sensor code matching repository and comprising all basic information about sensors in an M2M, so that when the M2M gateway fails to identify code matching of the faulty sensor, the M2M gateway downloads the sensor code matching repository from the M2M sensor management component and performs code matching again.

7. The M2M system according to claim 5, further comprising:
    an adjacent sensor comprising a third processor coupled with a fourth memory and configured to execute third program instructions on the fourth memory, wherein the third program instructions comprise: receiving a code matching command from the faulty sensor when the M2M gateway fails to identify code matching of the faulty sensor, performing code matching identification according to the code matching command, and if the adjacent sensor is able to identify the code matching of the faulty sensor, sending to a routing component a communication route establishment message, wherein the routing component is used for adding the faulty sensor in a routing table of the routing component itself and sending to the faulty sensor a code matching success feedback message.

8. The M2M system according to claim 7, wherein
the faulty sensor is configured to execute the first program instructions, wherein the first program instructions further comprise: sending to the adjacent sensor an uplink message when communication with the M2M gateway is necessary, and when the faulty sensor performs code matching with the adjacent sensor successfully; and
the adjacent sensor is configured to execute the third program instructions, wherein the third program instructions further comprise: after encapsulating the uplink message, sending the uplink message to the M2M gateway; and for a downlink message not intended for the adjacent sensor itself from the M2M gateway, inquiring the routing table to obtain a matched faulty sensor, and forwarding the downlink message to the obtained faulty sensor.

9. A Machine to Machine (M2M) gateway, comprising:
an M2M intercommunication component, configured to communicate with an M2M platform via a public communication channel;
a local communication component, configured to communicate with a sensor, and in a case that a fault is detected by a faulty sensor, obtain an automatic code matching command sent by the faulty sensor, and perform code matching identification according to the received automatic code matching command;
a protocol processing component, configured to take charge of a processing of an M2M application protocol, and convert a message to be of a protocol capable of being identified by the M2M platform;
a sensor management component, configured to take charge of sensor management, communication channel allocation management and identification code allocation management in a range of the M2M gateway;
a first automatic fault removing component configured to, in a case that the local communication component performs code matching successfully, adds the faulty sensor in the sensor management component.

10. The M2M gateway according to claim 9, wherein the faulty sensor comprises:
a communication component, configured to communicate with the M2M gateway and an adjacent sensor;
a code matching component, configured to perform mutual code matching with the M2M gateway or the adjacent sensor, and configured to generate an automatic code matching command according to an obtained code matching command, and send the automatic code matching command to the M2M gateway;
a second automatic fault removing component configured to, in a case that a communication fault is detected, send a code matching command to the code matching component;
a routing component, configured to perform routing transmission of a sensor message during intercommunication between sensors.

11. The M2M gateway according to claim 10, wherein when the local communication component fails to identify the code matching of the faulty sensor, the first automatic fault removing component downloads a sensor code matching repository from an M2M sensor management component, wherein the M2M sensor management component comprises all basic information about sensors in an M2M.

12. The M2M gateway according to claim 10, wherein when the local communication component fails to identify the code matching of the faulty sensor, the code matching component of the faulty sensor sends to an adjacent sensor of the faulty sensor a code matching command; a code matching component of the adjacent sensor performs code matching identification according to the code matching command, and if the code matching component of the adjacent sensor is able to identify the code matching of the faulty sensor, the adjacent sensor sends to a routing component a communication route establishment message; the routing component adds the faulty sensor in a routing table of the routing component itself, and sends to the faulty sensor a code matching success feedback message.

13. The M2M gateway according to claim 10, wherein after the faulty sensor performs code matching with the adjacent sensor successfully, the faulty sensor sends to the adjacent sensor an uplink message when communication with the M2M gateway is necessary, and after encapsulating the uplink message, the adjacent sensor sends the uplink message to the M2M gateway; and for a downlink message not intended for the adjacent sensor itself from the M2M gateway, the adjacent sensor inquires the routing table to obtain a matched faulty sensor, and forwards the downlink message to the obtained faulty sensor.

* * * * *